(12) United States Patent
Logan et al.

(10) Patent No.: US 9,238,279 B2
(45) Date of Patent: Jan. 19, 2016

(54) COMBUSTIBLE FLUID CUTTING SAFETY SYSTEM

(71) Applicants: David J. Logan, Pitt Meadows (CA); Jonathan A. Logan, Pitt Meadows (CA); Allan M. Horne, Maple Ridge (CA); Paul E. Christensen, Maple Ridge (CA)

(72) Inventors: David J. Logan, Pitt Meadows (CA); Jonathan A. Logan, Pitt Meadows (CA); Allan M. Horne, Maple Ridge (CA); Paul E. Christensen, Maple Ridge (CA)

( * ) Notice: Subject to any disclaimer, the term of this patent is extended or adjusted under 35 U.S.C. 154(b) by 0 days.

(21) Appl. No.: 14/225,645

(22) Filed: Mar. 26, 2014

(65) Prior Publication Data

US 2014/0205957 A1    Jul. 24, 2014

Related U.S. Application Data

(60) Provisional application No. 61/918,928, filed on Dec. 20, 2013, provisional application No. 61/926,426, filed on Jan. 13, 2013.

(51) Int. Cl.
*F23N 1/00* (2006.01)
*B23K 37/00* (2006.01)
*B23K 7/10* (2006.01)
*B23K 7/00* (2006.01)

(52) U.S. Cl.
CPC ............... *B23K 37/006* (2013.01); *B23K 7/00* (2013.01); *B23K 7/10* (2013.01)

(58) Field of Classification Search
CPC ........ B23K 7/10; B23K 10/00; B23K 37/006; F23N 1/00; F23N 3/002; F23N 3/00
USPC ......... 431/18, 157, 253; 126/512; 219/121.39
See application file for complete search history.

(56) References Cited

U.S. PATENT DOCUMENTS

| 1,915,446 | A | * | 6/1933 | Pressler ........................ 431/128 |
| 2,473,465 | A | * | 6/1949 | Betz .............................. 137/595 |
| 2,538,916 | A | * | 1/1951 | Rudolph .................... 239/419.3 |
| 2,939,410 | A | * | 6/1960 | Karpuk et al. .................. 431/29 |
| 3,180,969 | A |   | 4/1965 | Williams |
| 3,319,042 | A |   | 5/1967 | Thostrup et al. |
| 3,497,670 | A |   | 2/1970 | Thostrup |
| 3,581,051 | A | * | 5/1971 | Brown ....................... 219/130.5 |
| 3,662,147 | A |   | 5/1972 | Ogden, Sr. et al. |

(Continued)

FOREIGN PATENT DOCUMENTS

CN   101074780 A   11/2007
CN   201116735 Y    9/2008

(Continued)

OTHER PUBLICATIONS

WWS Group; "Weldability—An Introduction to MIG Welding"; 16 pages; www.weldability.com | support@weldability.com.

(Continued)

*Primary Examiner* — Avinash Savani
(74) *Attorney, Agent, or Firm* — Miltons IP/p.i.

(57) ABSTRACT

Embodiments of the present invention provide components and a system for providing a safer environment for using a cutting torch. The system includes a cutting torch and a control box. There is communication from the user to the control box to allow fluids to flow to the torch. The control box includes closed biased valve(s) such that if there is a condition where there is no instruction from the torch to the control box and/or power is lost, the valves will shut, preventing fluid from flowing into the torch.

15 Claims, 11 Drawing Sheets

(56) References Cited

U.S. PATENT DOCUMENTS

| | | | |
|---|---|---|---|
| 4,069,018 A * | 1/1978 | Karna et al. | 436/137 |
| 4,113,423 A | 9/1978 | Steiner | |
| 4,119,830 A | 10/1978 | Gilliland | |
| 4,527,037 A * | 7/1985 | Johnson et al. | 219/69.1 |
| 4,776,366 A | 10/1988 | Czerwinski et al. | |
| 5,208,436 A * | 5/1993 | Blankenship | 219/121.54 |
| 5,224,457 A * | 7/1993 | Arsenault et al. | 123/526 |
| 5,379,930 A * | 1/1995 | Liang | 266/74 |
| 5,550,344 A * | 8/1996 | Winterfeldt | 219/121.39 |
| 6,248,972 B1 | 6/2001 | Yamaguchi | |
| 7,905,722 B1 * | 3/2011 | Heath et al. | 431/12 |
| 8,080,762 B2 * | 12/2011 | Martin et al. | 219/130.5 |
| 2003/0160030 A1* | 8/2003 | Horner-Richardson et al. | 219/121.39 |
| 2007/0039935 A1 | 2/2007 | Justice | |
| 2007/0235428 A1 | 10/2007 | Schneider | |
| 2008/0210783 A1 | 9/2008 | Bissonnette | |
| 2013/0221585 A1 | 8/2013 | Bissonnette | |

FOREIGN PATENT DOCUMENTS

| | | |
|---|---|---|
| CN | 202780150 U | 3/2013 |
| EP | 0 774 622 A1 | 5/1997 |
| EP | 1477259 A1 | 11/2004 |
| WO | 2002066195 A2 | 8/2002 |
| WO | 2015089635 A1 | 6/2015 |

OTHER PUBLICATIONS

"Chapter 8—Gas Shielded-Arc Welding"; 22 pages; www.globalsecurity.org/military/library.

Arcraft Plasma Equipments (India) PVT. Ltd.; "Metal Inert Gas Welding"; 5 pages; Jan. 22, 2014; http://www.arcraftplasma.com/welding/weldingdata/metal_inert_gas_welding.htm.

* cited by examiner

COMBUSTIBLE FLUID CUTTING SAFETY SYSTEM

TECHNICAL FIELD

The invention relates to a fluid control system comprising of safety features.

BACKGROUND

When gas cutting in confined spaces, situations occur where combustible gas and/or mixtures may escape into the area and create a combustible situation.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
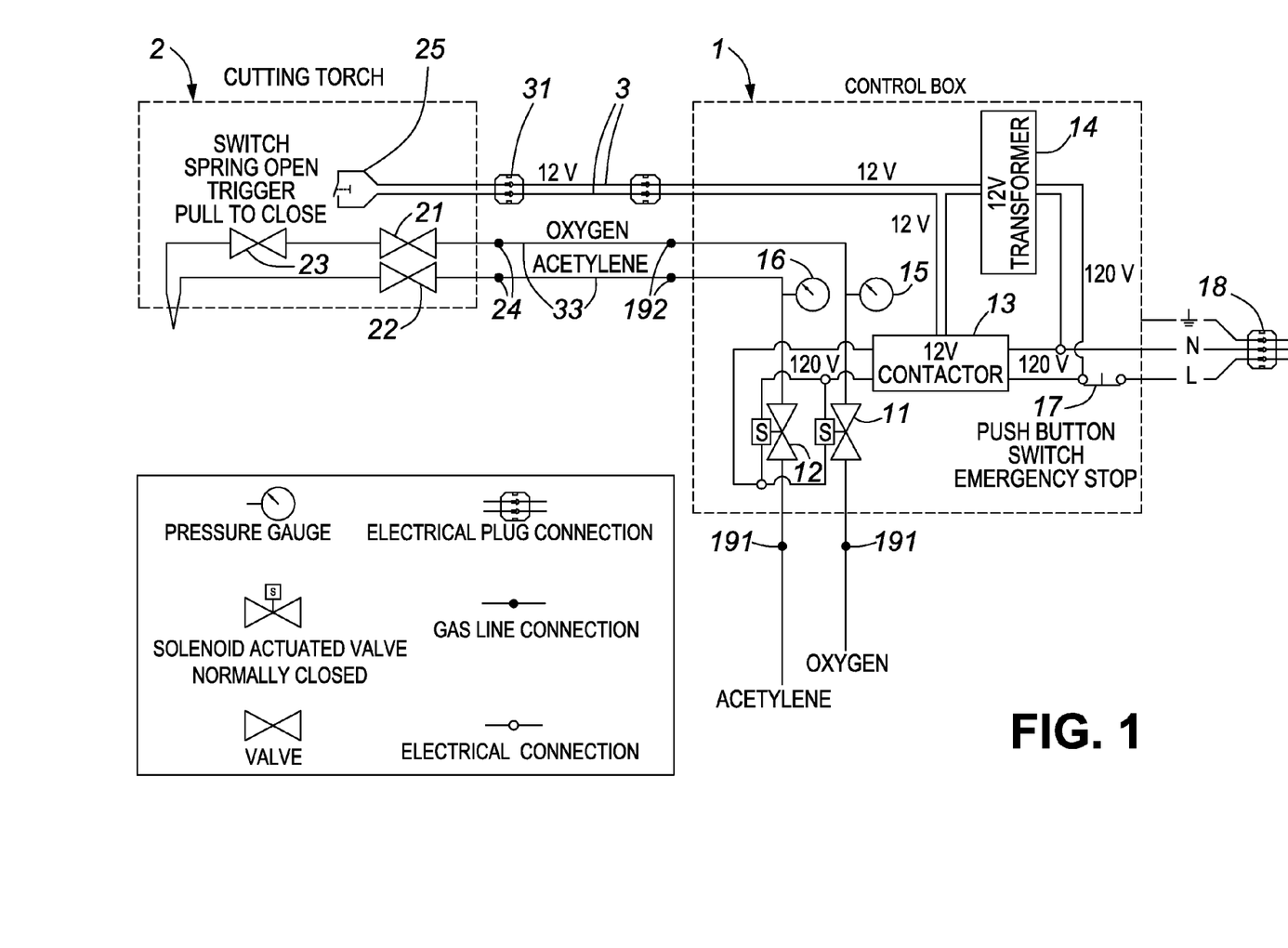
FIG. 1 shows a safety system in accordance with one example embodiment of the present disclosure.

Referring to FIG. 1, an embodiment of a safety system is shown. In one embodiment, the control box 1 comprises an oxygen valve 11 and a fuel valve 12 that can be connected to an oxygen source and a fuel source respectively. Both the oxygen valve 11 and the fuel valve 12 are biased to the closed position. In some embodiments, both the oxygen valve 11 and the fuel valve 12 are solenoid valves that are naturally closed until actuated by the supply of electricity, or in other embodiments, valves actuated by pneumatic pressure.

In some embodiments, the control box 1 further comprises a power switch 13. The power switch 13 is able to cut electricity to the solenoids of the oxygen valve 11 and/or the fuel valve 12. In some embodiments, the power switch 13 is a contactor. The power switch 13 can be in communication with a safety actuator 25 associated with the cutting torch 2. In some embodiments, when the safety actuator 25 is not engaged by a user, the power switch 13 will cut electricity to the oxygen valve 11 and/or the fuel valve 12. The closed biased nature of the oxygen valve 11 and the fuel valve 12 will shut the valves. This will serve to cut flow of oxygen and/or fuel flow out of the control box 1 and to the cutting torch 2 when connected.

In some embodiments, the control box 1 further comprises a transformer 14. The transformer 14 will drop the voltage that is being sent to the safety actuator 25. This will decrease the chances of an arc and/or harm to people if exposed to uncovered wiring.

In some embodiments, the control box 1 further comprises an oxygen gauge 15 and a fuel gauge 16. The oxygen gauge 15 and the fuel gauge 16 can measure the pressure in one or more lines 33 supplying the cutting torch 2.

In some embodiments, the control box 1 further comprises a kill switch 17. The kill switch 17, when actuated to the kill position, will prevent flow regardless of the state of the safety actuator 25. The kill switch 17 can be a push button. In some embodiments, once the kill switch 17 has been actuated to the kill position, all that is required is to push the kill switch 17 a second time to return the control box 1 to normal operation.

In some embodiments, the control box 1 will have a source of power. Some embodiments will comprise a rechargeable battery, a battery compartment in the housing that can accept batteries, and/or the power cable 18. The power cable 18 may have a plug compatible with standard outlets.

The control box 1 will also further comprise one or more inlets 191 (e.g. fuel inlet, oxygen inlet) and one or more outlets 192 (e.g. fuel outlet, oxygen outlet) to accept and expel the liquid or gas. The inlets 191 and the outlets 192 will enable hoses to be coupled thereto.

As can further been seen, a cutting torch 2 is present. The cutting torch 2 will have one or more lines 33 bringing gas or liquid to the torch inlet(s) 24 (e.g. oxygen inlet, fuel inlet) to the ignition point at the torch outlet. In the embodiment shown in FIG. 1, there are two lines 33, one line 33 for oxygen and another for fuel, in some embodiments the fuel is acetylene. In some embodiments the fuel is propane. It is understood that any combustible gas or combustible mixture of gases can be used in on ore more lines 33. Each line may have a valve at the cutting torch 2. In the embodiment shown in FIG. 1, there is a torch oxygen valve 21 and a torch fuel valve 22. In some embodiments, there will be a secondary oxygen valve 23 that is in-line with and is easier to actuate open and close than the torch oxygen valve 21. The secondary oxygen valve 23 will increase the flow of oxygen when actuated. In some embodiments, the secondary oxygen valve 23 will control or regulate the flow of the oxygen.

The cutting torch 2 will have one or more torch inlets 24 (e.g. fuel inlet, oxygen fuel inlet) to accept a connection to a hose. The cutting torch 2 also comprises a torch outlet where the fuel or fuel and oxygen combination is expelled out of the cutting torch 2.

As mentioned above, the cutting torch 2 will have a safety actuator 25 that can be in electrical contact with control box 1. In some embodiments, the safety actuator 25 will be opened biased. It will close when actively actuated by the user. The safety actuator 25 will help prevent unwanted flow of combustible material from the source of the fuel and/or oxygen.

Figure 9:
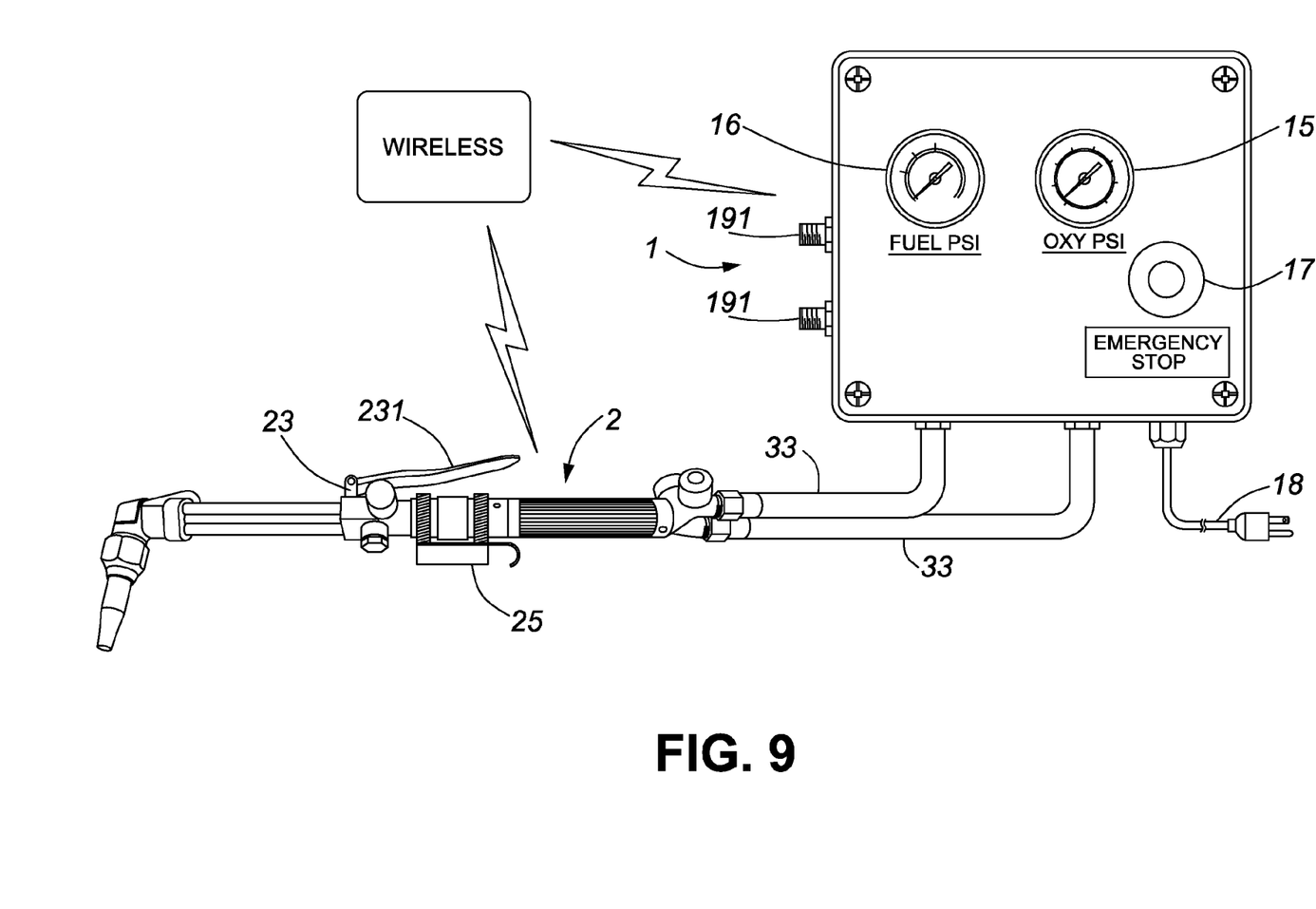
FIG. 9 shows an embodiment if a cutting system where the cutting torch and the control box are in wireless communication.

The connection between the safety actuator 25 and the control box 1 is established by the conduit 3. In some embodiments, the conduit 3 comprises electrical wire. When the user actuates the safety actuator 25, it results in the opening of the oxygen valve 11 and/or the fuel valve 12. In some embodiments, connectors 31 will be located near the control box 1 and the cutting torch 2. This will enable different lengths of conduits 3 to be used. In some embodiments, the conduit 3 will be embedded in or attached to the one or more lines 33. In other embodiments, the conduit 3 and the one or more lines 33 will be separate. In other embodiments, the conduit 3 is a wireless connection (as shown in FIG. 9). A pneumatic connection can also be established in some embodiments.

Figure 2:
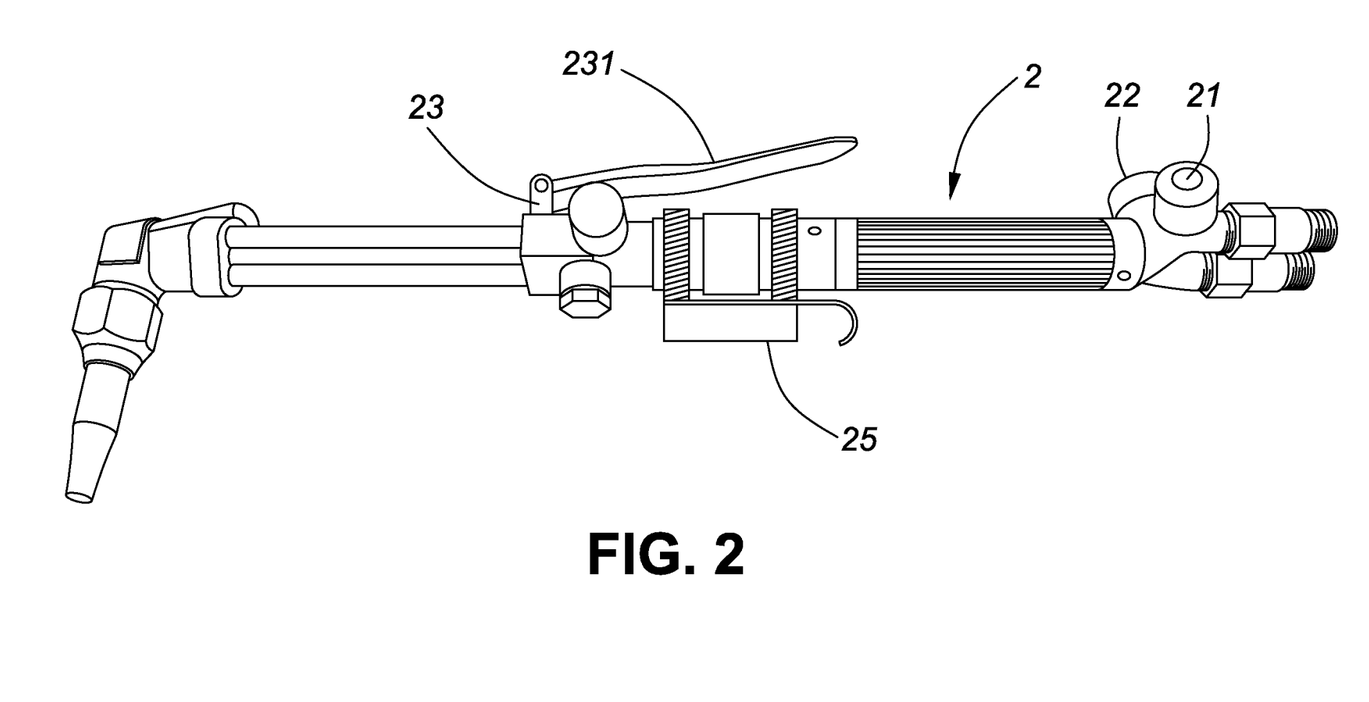
FIG. 2 shows an embodiment of a cutting torch.

Referring to FIG. 2, an embodiment of a cutting torch 2 is shown. In order to use the cutting torch 2, the user would need to open the torch oxygen valve 21 and the torch fuel valve 22. However, until the safety actuator 25 is actuated, fuel and/or oxygen will not flow to the cutting torch 2.

Figure 3:
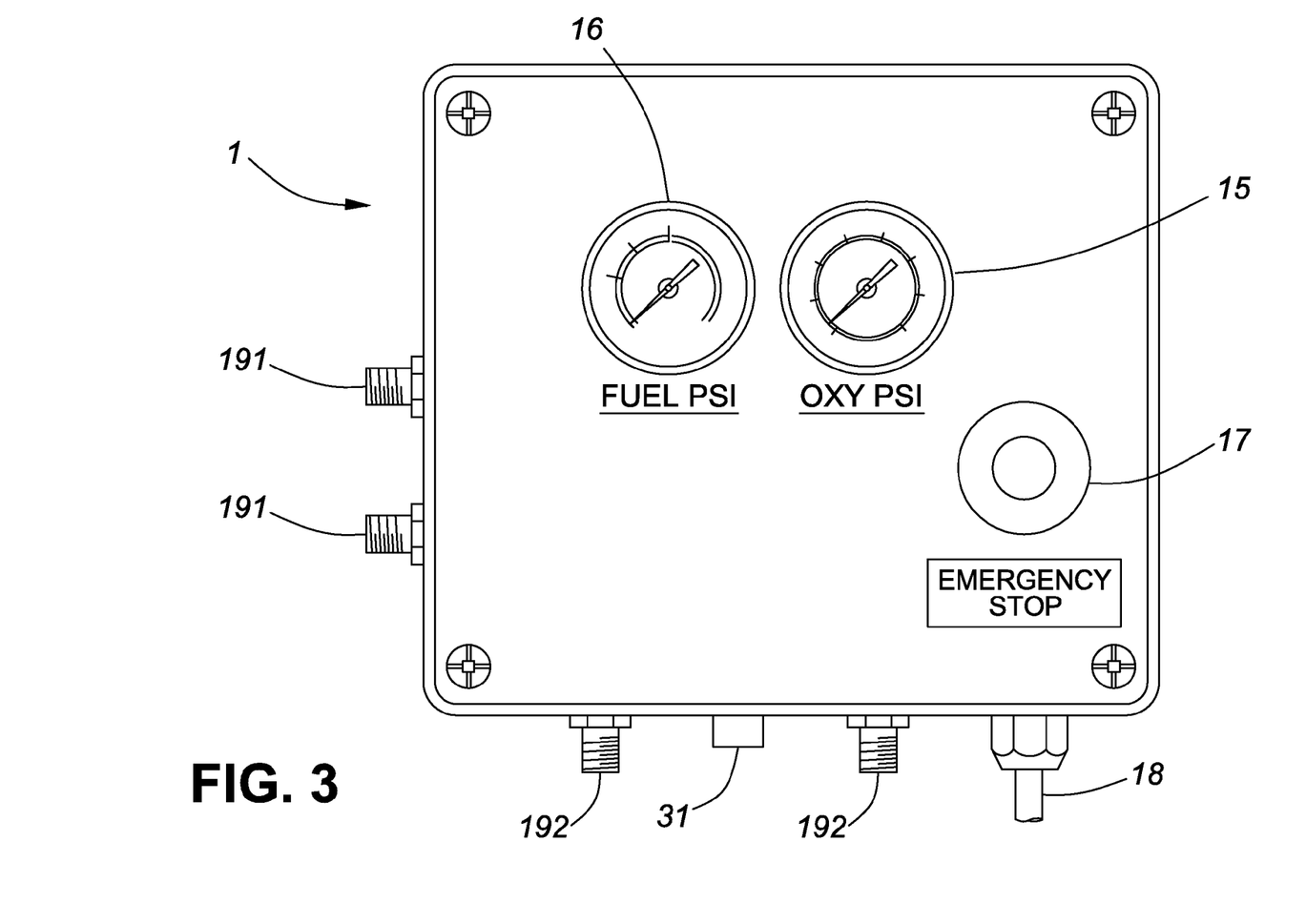
FIG. 3 shows an embodiment of a control box.

Referring to FIG. 3, an embodiment of a control box 1 is shown. As can be seen, a kill switch 17 can be a large button easily seen by a user and hit in an emergency situation. The oxygen gauge 15 and the fuel gauge 16 can display the pressure within one or more lines 33.

Figure 4:
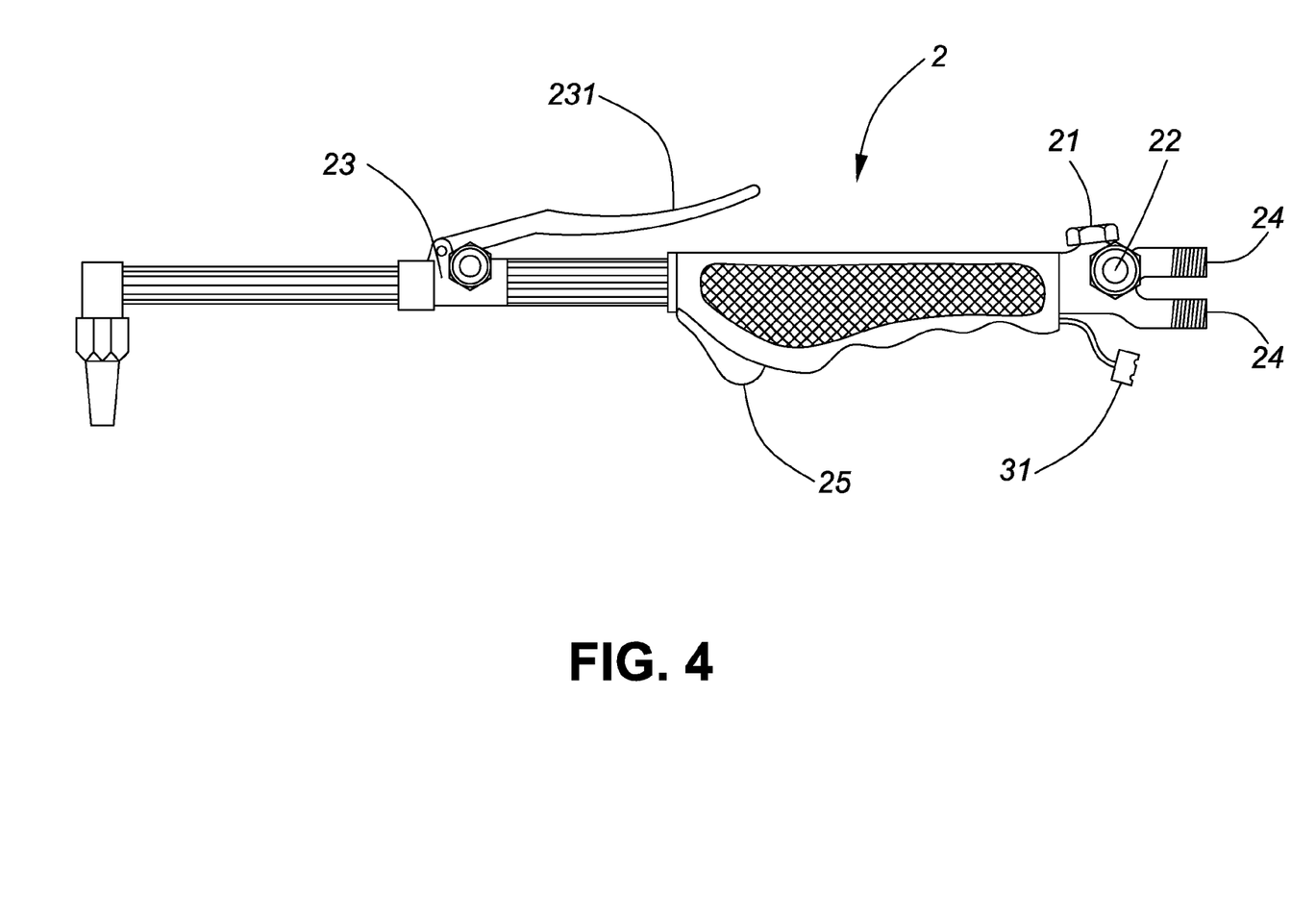
FIG. 4 shows an embodiment of a cutting torch.

Referring to FIG. 4, one embodiment of a cutting torch 2 is shown. As shown in FIG. 2, the safety actuator 25 can comprise a trigger 258 that is open biased by a spring 259 (as seen in FIGS. 10A-11B).

Figure 5:
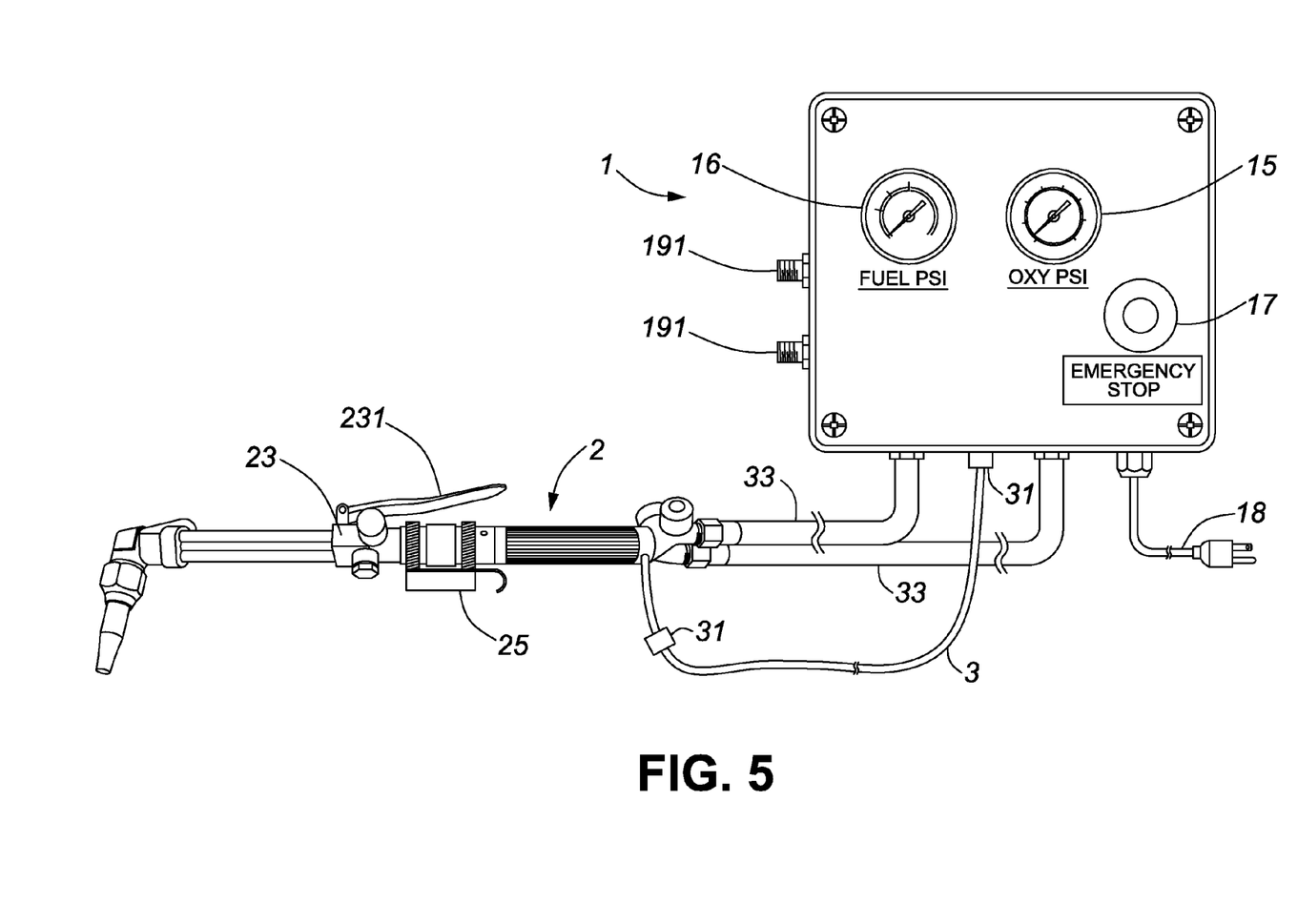
FIG. 5 shows an embodiment of a cutting system.

Referring to FIG. 5, one embodiment of the cutting system is shown. The conduit 3 is external of the lines 33 and attached to the cutting torch 2 via the connectors 31. It is understood that the conduit 3 can be, in some embodiments, integral (e.g. no connectors 31) with the control box 1 and the cutting torch 2.

Figure 6:
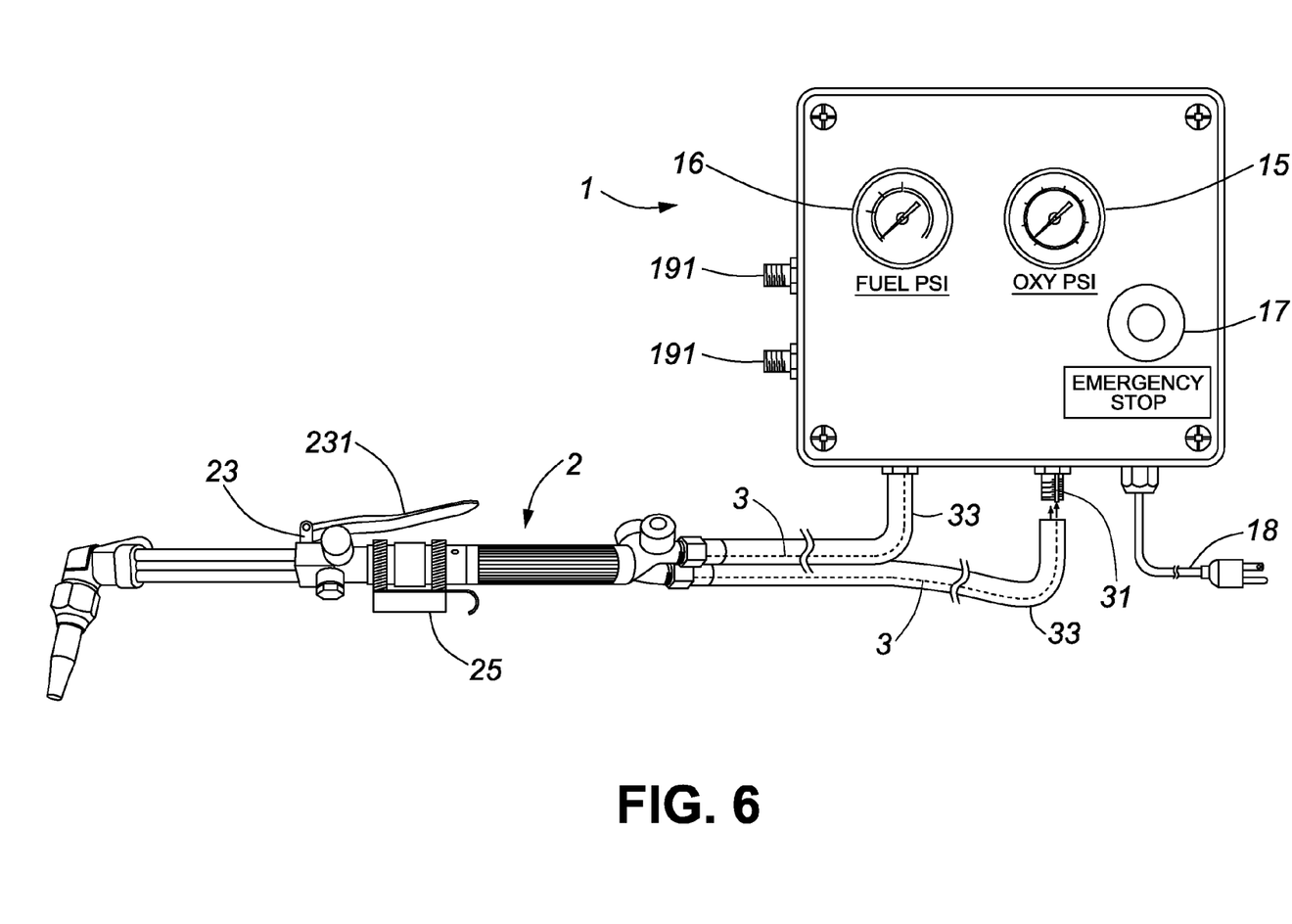
FIG. 6 shows an embodiment of a cutting system with integrated wiring.

Referring to FIG. 6, one embodiment of the cutting system is shown having the connection between the safety actuator 25 and the oxygen valve 11 and/or fuel valve 12 established by conduit(s) 3 running in, attached to, and/or along the line(s) 33. As shown in FIG. 6, there are two conduits 3, one in each line. The conduits 3 can be wiring or pneumatic tubing. By separating them in different lines 33, it is believed to lessen the likelihood of creating an arc, which is dangerous in the gas cutting environment, when using electric current. As can be seen, there is a connector 31 present at the control box 1 that will supply the connection to the conduit 3. This can be electrical or a pneumatic connection. Some embodiments will have a conduit 3 that is only present in one line 33, thus there only be one connector 31. Given that different jobs may have different length requirements, different hoses are sometimes used. When the conduit(s) 3 are integrated with the lines 33, there is no need to worry about another component to make sure the lengths of the lines 33 and the conduit(s) 3 are conducive to each other.

Figure 7:
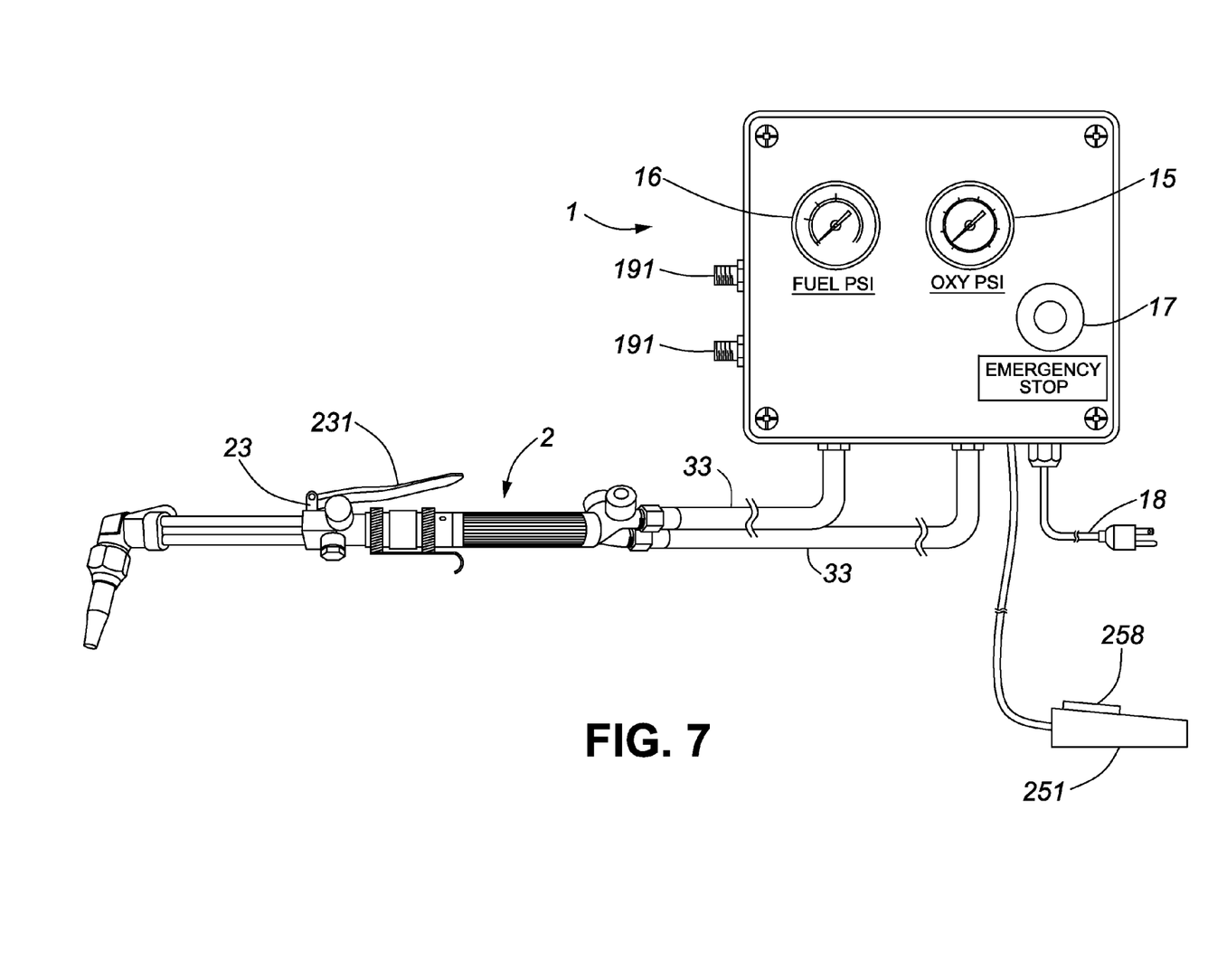
FIG. 7 shows an embodiment of a cutting system having a remote safety actuator connected directly to the control box.
Figure 8:
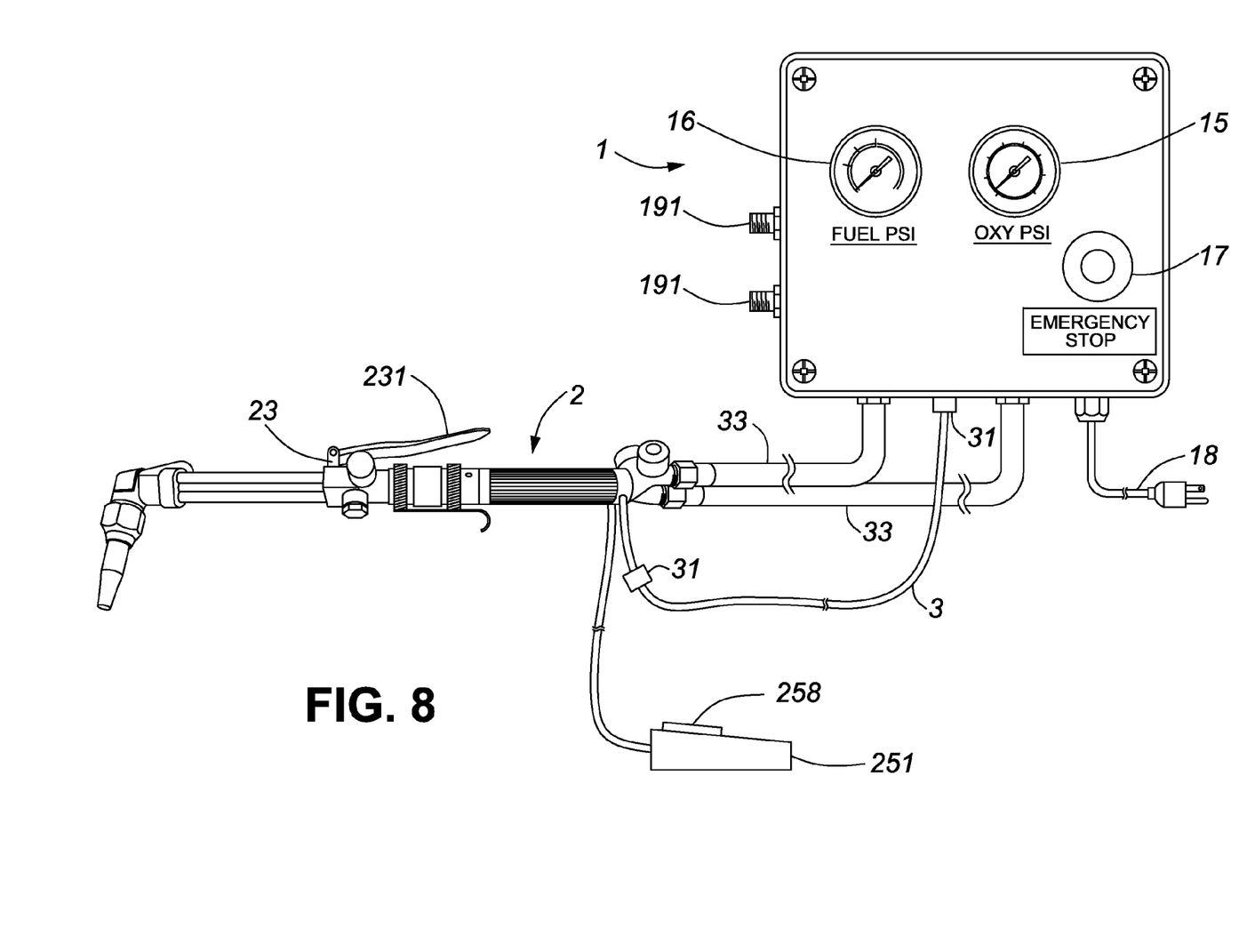
FIG. 8 shows an embodiment of a cutting system having a remote safety actuator connected to the torch.

Referring to FIGS. 7 and 8, a remote safety actuator 251 is present. In some embodiments, the remote safety actuator 251 is a foot pedal with a trigger 258. The remote safety actuator 251 acts in the same manner as the safety actuator 25. The remote safety actuator 251 can be attached directly to the control box 1, as seen in FIG. 7. In these embodiments, there is no need for a safety actuator 25, located at the cutting torch 2, nor a conduit 3. As seen in FIG. 8, the remote safety actuator 251 can attach to the cutting torch 2, via a cable. In these embodiments, the length of the conduit 3 attaching the remote safety actuator 251 to the cutting torch 2 can be predetermined. In the embodiments with a foot pedal, different lengths can be designed for users of different heights.

Referring to FIG. 9, an embodiment using wireless communication between the safety actuator 25 and the control box 1. In some embodiments, the wireless communication can be accomplished by electromagnetic radiation, BLUETOOTH, and/or Wi-Fi. The connection can be a direct connection or relayed through a hub. Power can be supplied to a wireless transmitter in the cutting torch 2 from the control box 1 or a battery, rechargeable or not. The battery can be located in a compartment that is integral with the cutting torch 2. The remote safety actuator 251 can be attached to a cutting torch 2 that comprises a wireless transmitter.

Figure 10A:
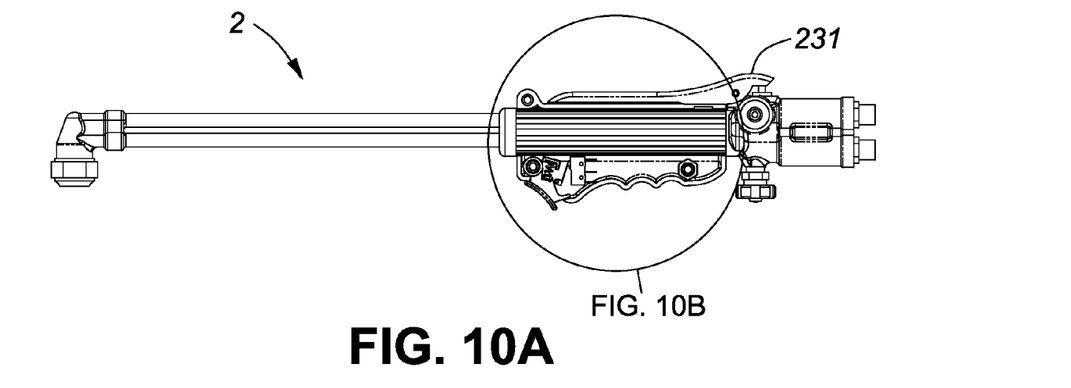
FIG. 10A shows an embodiment of a cutting torch.
Figure 10B:
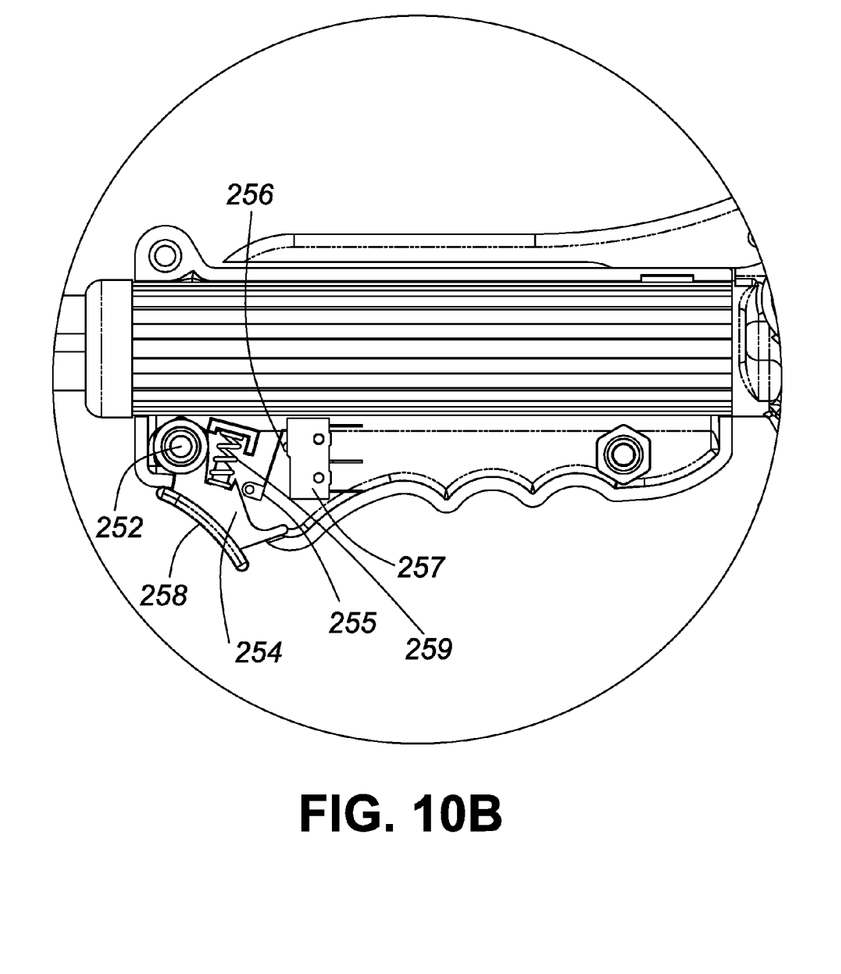
FIG. 10B is a detail of FIG. 10.
Figure 11A:
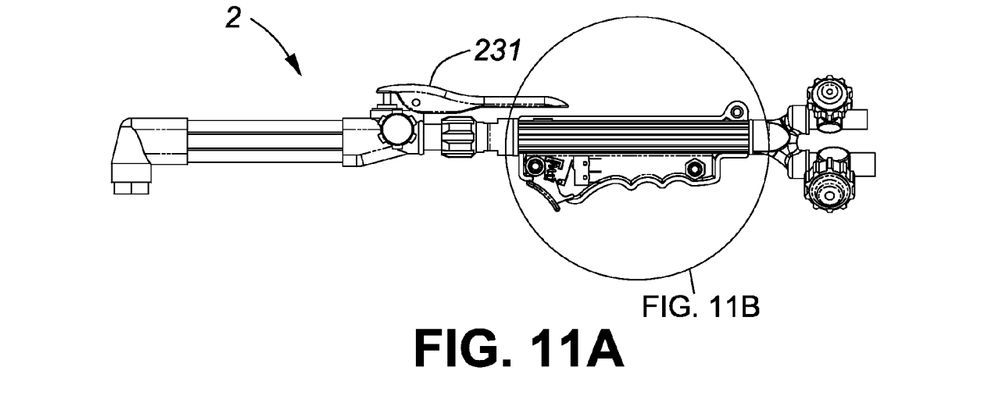
FIG. 11A shows another embodiment of a cutting torch.
Figure 11B:
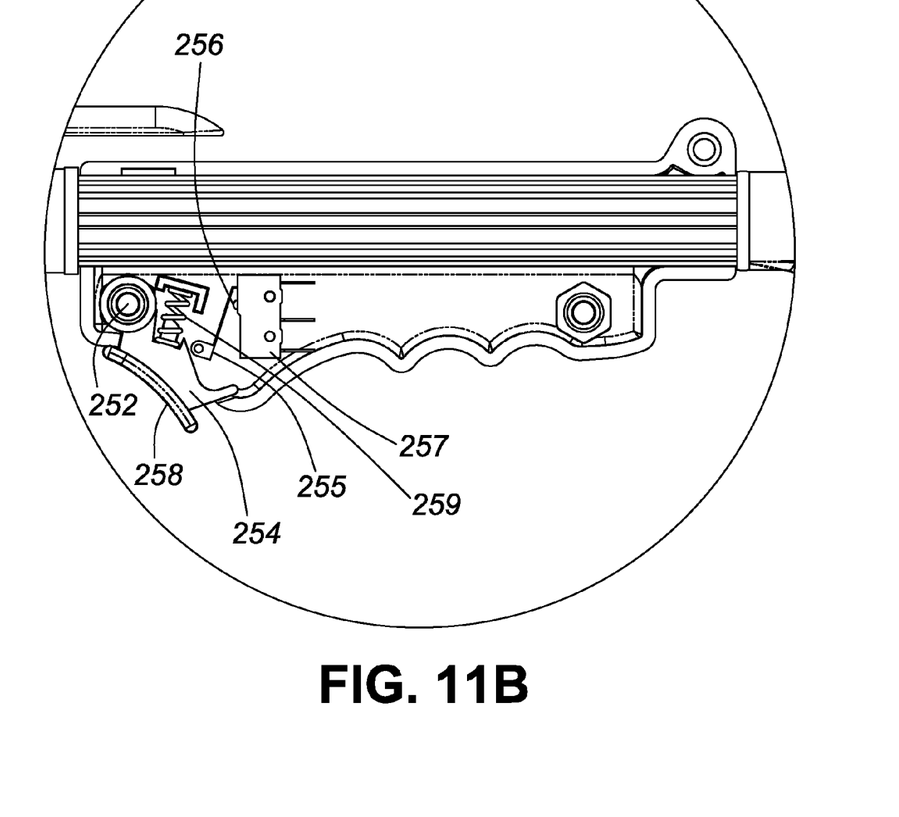
FIG. 11B is a detail of FIG. 11.

Referring to FIGS. 10 and 11, show embodiments of the cutting torch 2. A secondary oxygen valve 23 is present in both, while the secondary oxygen valve lever 231 may extend in opposite directions. An embodiment of the safety actuator 25 is shown in detail. A trigger 258 rotates about an axel 252. When the trigger 258 rotates about the axel 252, the trigger arm 254 will compress the spring 259 and actuate the roller lever arm 255, which in turn will actuate the button 256. This will actuate the switch 257. In some embodiments, the switch 257 can be an electrical switch. In some embodiments, the switch 257 will be the OMRON switch, model number SS-5GL2T. Only when the button 256 is pressed, will the oxygen valve 11 and/or the fuel valve 12 open. In embodiments using electricity, a current will flow to the closed biased oxygen valve 11 and/or the fuel valve 12 to actuate them to open. In embodiments employing pneumatic pressure, a pneumatic switch will be employed and air pressure will cause the opening of the closed biased oxygen valve 11 and/or the fuel valve 12. While not shown in FIGS. 10 and 11, any connection between the cutting torch 2 and the control box 1 discussed above can be used.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. And while the invention has been described above with respect to several embodiments, any element and/or step described in reference to any particular embodiment is hereby disclosed to be associated with any other embodiment of the invention. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. An apparatus comprising:
   a cutting torch comprising:
   a torch body comprising:
     a safety actuator comprising a trigger;
     two torch inlets, comprising a first torch inlet and a second torch inlet;

a secondary oxygen valve; and
a torch outlet; and
a conduit;
wherein the two torch inlets are configured to allow liquids, gasses, or a combination thereof into the cutting torch; the torch outlet is configured to allow the liquid, gas, or the combination of the two exit the torch outlet; the secondary oxygen valve is located in a path from the first torch inlet and the torch outlet, and the secondary oxygen valve is configured to increase the flow, along the path to the torch outlet, when actuated; and the safety actuator is in communication with the conduit, and the safety actuator is configured to express a state of the trigger along the conduit.

2. The apparatus of claim 1, wherein the safety actuator further comprises a pneumatic switch and the conduit comprises tubing.

3. The apparatus of claim 1, wherein the safety actuator further comprises an electrical switch and the conduit comprises a wireless transmitter.

4. The apparatus of claim 1, wherein the safety actuator further comprises an electrical switch and the conduit comprises electrical wire.

5. The apparatus of claim 4, wherein the cutting torch further comprises a connector connected to the conduit.

6. The apparatus of claim 4, wherein the conduit is integral with or adjacent to at least one of the two torch inlets.

7. The apparatus of claim 1, wherein the safety actuator comprises a remote safety actuator that is attached to a cable that extends from the cutting torch.

8. The apparatus of claim 1, wherein the cutting torch further comprises a battery.

9. An apparatus comprising:
a cutting torch comprising:
    a safety actuator comprising a trigger;
    two torch inlets, comprising a first torch inlet and a second torch inlet;
    a secondary oxygen valve;
    a torch outlet; and
    a conduit; and
a control box comprising:
    a housing;
    a fuel valve, wherein the fuel valve is closed biased;
        a fuel inlet; and
        a fuel outlet;
wherein the cutting torch is in communication with the control box via the conduit; one of the two torch inlets is connected to the fuel outlet via a line; the two torch inlets are configured to allow liquids, gasses, or a combination thereof into the cutting torch; the torch outlet is configured to allow the liquid, gas, or the combination of the two exit the torch outlet; the secondary oxygen valve is located in a path from the first torch inlet and the torch outlet, and the secondary oxygen valve is configured to increase the flow, along the path to the torch outlet, when actuated; the safety actuator is in communication with the conduit, and the safety actuator is configured to express a state of the trigger along the conduit to the fuel valve, and the fuel valve will open when the trigger is actuated; and the fuel valve is located in the housing and is configured to regulate flow between the fuel inlet and the fuel outlet.

10. The apparatus of claim 9, wherein the conduit comprises electrical wire, tube, or wireless communication.

11. The apparatus of claim 9, wherein the conduit comprises electrical wiring that is integral with the line.

12. The apparatus of claim 9, wherein the control box further comprises an oxygen inlet; an oxygen outlet; and an oxygen valve, wherein the oxygen valve is closed biased.

13. The apparatus of claim 12, wherein the control box further comprises kill switch that is configured to cause closure of the fuel valve and the oxygen valve when the kill switch is actuated to a kill position.

14. The apparatus of claim 9, wherein the safety actuator comprises a remote safety actuator that is attached to a cable that extends from the cutting torch.

15. The apparatus of claim 1, further comprising a torch oxygen valve and a torch fuel valve; wherein the torch oxygen valve is configured to adjust flow from the first torch inlet, and the torch fuel valve is configured to adjust flow from the second torch inlet.

* * * * *